(12) United States Patent
Kopp

(10) Patent No.: US 10,865,905 B2
(45) Date of Patent: *Dec. 15, 2020

(54) CLOSED CENTER PRESSURE FLOW CONTROL VALVE

(71) Applicant: Moog Inc., East Aurora, NY (US)

(72) Inventor: John Kopp, West Seneca, NY (US)

(73) Assignee: Moog Inc., East Aurora, NY (US)

( * ) Notice: Subject to any disclaimer, the term of this patent is extended or adjusted under 35 U.S.C. 154(b) by 24 days.

This patent is subject to a terminal disclaimer.

(21) Appl. No.: 16/243,955

(22) Filed: Jan. 9, 2019

(65) Prior Publication Data

US 2019/0211943 A1    Jul. 11, 2019

Related U.S. Application Data

(63) Continuation of application No. 15/445,343, filed on Feb. 28, 2017, now Pat. No. 10,180,194.

(Continued)

(51) Int. Cl.
| | |
|---|---|
| *F16K 31/04* | (2006.01) |
| *F16K 11/07* | (2006.01) |

(Continued)

(52) U.S. Cl.
CPC .......... *F16K 31/04* (2013.01); *F15B 13/0435* (2013.01); *F15B 13/0444* (2013.01);
(Continued)

(58) Field of Classification Search
CPC ........ F16K 31/04; F16K 11/07; F16K 31/047; F16K 31/0613; F16K 31/124; F15B 13/0435; F15B 13/0444; H01F 7/06
See application file for complete search history.

(56) References Cited

U.S. PATENT DOCUMENTS

| | | | | |
|---|---|---|---|---|
| 3,228,423 A | ‡ | 1/1966 | Moog, Jr. | ........... F15B 13/0438 |
| | | | | 137/62 |
| 3,747,570 A | ‡ | 7/1973 | Versari | ................ F15B 13/0436 |
| | | | | 137/625.64 |

(Continued)

FOREIGN PATENT DOCUMENTS

| | | | | |
|---|---|---|---|---|
| BE | 551 168 A | ‡ | 10/1956 | |
| EP | 0853731 B1 | ‡ | 12/2000 | ................ F15B 9/10 |

(Continued)

OTHER PUBLICATIONS

The International Search Report and Written Opinion of the searching authority for PCT Application Serial No. PCT/US2017/019954; completed Jun. 13, 2017.‡

(Continued)

*Primary Examiner* — Kevin R Barss
(74) *Attorney, Agent, or Firm* — Harter Secrest & Emery LLP

(57) ABSTRACT

A servovalve comprising a motor, a motor bias mechanism, a first stage valve having a first position, a second stage valve movable with movement of the first valve, a reference member in fluid communication with the second valve, a transfer link acting between the first valve and the reference member, an eccentric drive acting between the motor and transfer link, wherein movement of the motor causes the transfer link to move the first valve, movement of the first valve causes the second valve member to move, movement of the second valve applies on the reference member a pressure differential from a load, the pressure differential on the reference member causes movement of the reference member, and movement of the reference member causes the transfer link to move the first valve back to the first position.

16 Claims, 9 Drawing Sheets

Related U.S. Application Data

(60) Provisional application No. 62/302,519, filed on Mar. 2, 2016.

(51) Int. Cl.
| | | |
|---|---|---|
| *F16K 31/06* | (2006.01) | |
| *F15B 13/043* | (2006.01) | |
| *F15B 13/044* | (2006.01) | |
| *F16K 31/124* | (2006.01) | |
| *H01F 7/06* | (2006.01) | |
| *H02K 1/12* | (2006.01) | |
| *H02K 1/27* | (2006.01) | |
| *H02K 3/28* | (2006.01) | |

(52) U.S. Cl.
CPC ............ *F16K 11/07* (2013.01); *F16K 31/047* (2013.01); *F16K 31/0613* (2013.01); *F16K 31/124* (2013.01); *H01F 7/06* (2013.01); *H02K 1/12* (2013.01); *H02K 1/2706* (2013.01); *H02K 3/28* (2013.01)

(56) References Cited

U.S. PATENT DOCUMENTS

| | | | | | |
|---|---|---|---|---|---|
| 4,641,812 | A | ‡ | 2/1987 | Vanderlaan | ......... F15B 13/0402 251/12 |
| 4,951,549 | A | ‡ | 8/1990 | Olsen | ....................... F15B 9/03 91/361 |
| 5,135,030 | A | ‡ | 8/1992 | Schoen | ................. F15B 13/043 137/625.63 |
| 5,146,126 | A | ‡ | 9/1992 | Hutchins | ............... F16K 31/041 251/12 |
| 5,263,680 | A | ‡ | 11/1993 | Laux | ................... F15B 13/0402 137/62 |
| 6,039,077 | A | ‡ | 3/2000 | Schulze | .................... F15B 9/10 137/62 |
| 6,334,604 | B1 | ‡ | 1/2002 | Roth | ................... F15B 13/0444 137/33 |
| 8,210,208 | B2 | * | 7/2012 | Tibbitts | ................ F16K 31/082 137/625.65 |
| 10,180,914 | B2 | * | 1/2019 | Hulick | .................. G06F 12/145 |
| 2006/0082237 | A1 | ‡ | 4/2006 | Kerlin | .................... H02K 1/145 310/16 |

FOREIGN PATENT DOCUMENTS

| | | | | | |
|---|---|---|---|---|---|
| EP | 1295041 | B1 | ‡ | 10/2004 | .......... F15B 13/0444 |
| JP | 5874602 | U | ‡ | 5/1983 | |
| JP | 63203904 | A | ‡ | 8/1988 | |

OTHER PUBLICATIONS

The International Search Report and Written Opinion of the International Searching Authorityfor PCT Application Serial No. PCT/US2015/053225; completed Dec. 4, 2015.‡

\* cited by examiner
‡ imported from a related application

CLOSED CENTER PRESSURE FLOW CONTROL VALVE

RELATED APPLICATIONS

This application is a continuation of U.S. application Ser. No. 15/445,343, filed Feb. 28, 2017, which claims priority to and the benefit of U.S. Provisional Application No. 62/302,519, filed Mar. 2, 2016; both of which are incorporated herein by reference in their entireties.

TECHNICAL FIELD

The present invention relates generally to the field of electrohydraulic servovalves and, more particularly, to an improved electrohydraulic pressure flow control servovalve.

BACKGROUND ART

Electrohydraulic servovalves are known. These may be thought of as having either a single stage or as having multiple stages. In both forms, a valve spool is slidably mounted within a cylinder for controlled movement there along. When the valve spool is in a centered or null position within the cylinder, various lands on the valve spool cover ports that communicate with the control outlets to prevent flow through the valve. The direction and magnitude of spool movement off-null controls the flows through the valve. Various forms of single-stage servovalves are representatively shown and described in U.S. Pat. Nos. 4,951,549, 5,263,680, 4,641,812, and 5,146,126, the aggregate disclosures of which are hereby incorporated by reference.

A single-stage or direct-drive valve generally has a motor or some other mechanism that directly engages the valve spool, and which selectively causes the spool to move off-null. A multiple-stage valve may have a pilot stage that controls movement of a valve spool in a second stage. The pilot stage may be an electrical section, and the second stage may be an hydraulic section. One example of a two-stage electrohydraulic servovalve is shown and described in U.S. Pat. No. 3,228,423, the aggregate disclosure of which is hereby incorporated by reference.

BRIEF SUMMARY OF THE INVENTION

With parenthetical reference to the corresponding parts, portions or surfaces of the disclosed embodiment, merely for purposes of illustration and not by way of limitation, an improved two stage electro-hydraulic servovalve (15) is provided comprising a motor (16) having a stator (18) and a rotor (19) having a rotor null position (FIG. 1) and configured and arranged to rotate about a motor axis (17) under the effect of a magnetic field generated by the stator; a first bias mechanism (20) configured and arranged to bias the rotor to the rotor null position; a first stage valve (21) having a first valve member (22) movably mounted in a first chamber (23) along a first valve axis (24), and adapted to be moved from a first null position (FIG. 1) to a first off-null position (FIG. 4) along the first chamber axis to selectively meter fluid flow from at least one port (25, 26) defined between the first valve member and the first chamber; a second stage valve (28) in fluid communication with the port of the first valve and having a second valve member (29) movably mounted in a second chamber (30) along a second valve axis (31), and adapted to be moved from a first position (FIG. 1) to a second position (FIG. 5) along the second valve axis as a function of movement of the first valve member, to selectively meter the flow of fluid from at least one control port (32, 33) and at least one reference port (86, 87) between the second valve member and the second chamber; the first stage valve and the second stage valve configured and arranged such that the second stage valve member is at a pressure equilibrium and does not move when the first stage valve member is in the null position; a reference stage element (80) in fluid communication with the reference port of the second stage valve and having a separate reference member (81) moveably mounted in a reference chamber (82) along a reference axis (83), and adapted to be moved from a first position (FIG. 1) to a second position (FIG. 5) along the reference axis as a function of a pressure differential on the reference member; a second bias mechanism (84a, 84b) configured and arranged to bias the reference member along the reference axis; a transfer link (34) acting between the first valve member and the reference member; an eccentric drive member (35) acting between the rotor and the transfer link and having a first eccentric axis (36) that is off-set a distance (51) from the motor axis and arranged such that selective rotation of the rotor about the motor axis causes the transfer link to move; the transfer link and the drive member configured and arranged such that selective movement of the rotor from the rotor null position to a second rotor position (FIG. 4) causes the drive member and the transfer link to move the first valve member from the first null position to the first off-null position (FIG. 4); movement of the first valve member from the first null position to the first off-null position causes the second valve member to move from the first position to the second position (FIG. 5); the movement of the second valve member to the second position applies on the reference member a hydraulic pressure differential from a load; the hydraulic pressure differential on the reference member causes movement of the reference member; and movement of the reference member causes the transfer link to move the first valve member from the first off-null position back to the null position (FIG. 5).

The transfer link may comprise a first end portion (58) engaging the first valve member at a first connection (70); the transfer link may comprise a second end portion (59) engaging the reference member at a second connection (72); and the eccentric drive member and the transfer link may be coupled at a third connection (71). The transfer link and the eccentric drive member may be rotationally coupled at the third connection. The transfer link may be configured and arranged to move the first valve member from the first null position to the first off-null position with selective rotation about the second connection. The transfer link may be configured and arranged to move the first valve member from the first off-null position back to the null position with selective rotation about the third connection. The transfer link may be configured and arranged to move the first valve member from the first off-null position back to the null position with selective rotation about the first eccentric axis. The first eccentric axis (36) may be aligned with the third connection (71).

The second stage valve may comprise a second reference port (87); the reference chamber of the reference stage element may comprise a first sub-chamber (85a) and a second sub-chamber (85b); the first reference port of the second stage valve may be flow connected to the first sub-chamber and the second reference port of the second stage valve may be flow connected to the second sub-chamber; and the reference member may be adapted to be moved from the first position to the second position along the reference axis as a function of a hydraulic pressure differential between the first sub-chamber and the second sub-chamber. The first stage valve may comprise a second port (26); the second chamber of the second stage valve may comprise a first sub-chamber (65a) and a second sub-chamber (65b); the first port of the first stage valve may be flow connected to the first sub-chamber of the second stage valve and the second port of the first stage valve may be flow connected to the second sub-chamber of the second stage valve; and the second valve member may be adapted to be moved from the first position to the second position along the second valve axis as a function of a hydraulic pressure differential between the first sub-chamber and the second sub-chamber of the second stage valve.

The second bias mechanism may comprise a first bias element (84a) configured and arranged to bias the reference member in a first direction along the reference axis and a second bias element (84b) configured and arranged to bias the reference member in a second direction opposite to the first direction along the reference axis. Each of the first bias element and the second bias element may comprise a spring. The first chamber, the second chamber and the reference chamber may each comprise a cylinder and the first stage valve member and the second stage valve member may each comprise a valve spool and the reference member may comprise a piston. The first bias mechanism may comprise a torsional spring (46). The rotor may consist essentially of a magnet. The stator may comprise a circular ring-like core (43) and windings about the core (44, 45) orientated in opposite directions around the core. The first stage valve member may comprise a slot (75) bounded by substantially-parallel walls (60) and the transfer link may comprise a rounded marginal end portion (58) engaging the walls of the slot of the first stage valve member. The reference member may comprise an opening or slot (76) bounded by substantially-parallel walls (61) and the transfer link may comprise a second rounded marginal end portion (59) engaging the walls of the opening of the reference member. The servovalve may comprise at least one bearing (56) acting between the drive member and the transfer link. The motor may be toroidal. The control port of the valve may be in fluid communication with an actuator having a load.

In another aspect, a servovalve (115) is provided comprising a motor (16) having a stator (18) and a rotor (19) having a rotor null position (FIG. 6) and configured and arranged to rotate about a motor axis (17) under the effect of a magnetic field generated by the stator; a first bias mechanism (20) configured and arranged to bias the rotor to the rotor null position; a valve (121) having a valve member (122) movably mounted in a valve chamber (123) along a valve axis (124), and adapted to be moved from a first null position (FIG. 6) to a first off-null position (FIG. 7) along the valve axis to selectively meter fluid flow from at least one control port (132, 133) and at least one reference port (186, 187) defined between the valve member and the valve chamber; a reference stage element (180) in fluid communication with the reference port of the valve and having a reference member (181) moveably mounted in a reference chamber (182) along a reference axis (183), and adapted to be moved from a first position (FIG. 6) to a second position (FIG. 8) along the reference axis as a function of a pressure differential on the reference member; a second bias mechanism (184a, 184b) configured and arranged to bias the reference member along the reference axis; a transfer link (34) acting between the first valve member and the reference member; an eccentric drive member (35) acting between the rotor and the transfer link and having a first eccentric axis (36) that is off-set a distance (51) from the motor axis and arranged such that selective rotation of the rotor about the motor axis causes the transfer link to move; the transfer link and the drive member configured and arranged such that selective movement of the rotor from the rotor null position to a second rotor position (FIG. 7) causes the drive member and the transfer link to move the valve member from the first null position to the first off-null position (FIG. 7); movement of the valve member from the first null position to the first off-null position applies on the reference member a hydraulic pressure differential from a load; the hydraulic pressure differential on the reference member causes movement of the reference member; and movement of the reference member causes the transfer link to move the first valve member from the first off-null position back to the null position (FIG. 8).

The transfer link may comprise a first end portion (58) engaging the valve member at a first connection (170); the transfer link may comprise a second end portion (59) engaging the reference member at a second connection (172); and the eccentric drive member and the transfer link may be coupled at a third connection (71). The transfer link and the eccentric drive member may be rotationally coupled at the third connection. The transfer link may be configured and arranged to move the valve member from the first null position to the first off-null position with selective rotation about the second connection. The transfer link may be configured and arranged to move the valve member from the first off-null position back to the null position with selective rotation about the third connection. The transfer link may be configured and arranged to move the valve member from the first off-null position back to the null position with selective rotation about the first eccentric axis. The first eccentric axis (36) may be aligned with the third connection (71).

The valve may comprise a second reference port (187); the reference chamber of the reference stage element may comprise a first sub-chamber (185a) and a second sub-chamber (185b); the first reference port of the valve may be flow connected to the first sub-chamber and the second reference port of the valve may be flow connected to the second sub-chamber; and the reference member may be adapted to be moved from the first position to the second position along the reference axis as a function of a hydraulic pressure differential between the first sub-chamber and the second sub-chamber.

The second bias mechanism may comprise a first bias element (184a) configured and arranged to bias the reference member in a first direction along the reference axis and a second bias element (184b) configured and arranged to bias the reference member in a second direction opposite to the first direction along the reference axis. Each of the first bias element and the second bias element may comprise a spring. The valve chamber and the reference chamber may each comprise a cylinder and the valve member may comprise a valve spool and the reference member may comprise a piston. The first bias mechanism may comprise a torsional spring (46). The rotor may consist essentially of a magnet. The stator may comprise a circular ring-like core (43) and windings about the core (44, 45) orientated in opposite directions around the core. The valve member may comprise a slot (175) bounded by substantially-parallel walls (160) and the transfer link may comprise a rounded marginal end portion (58) engaging the walls of the slot of the valve member. The reference member may comprise an opening or slot (176) bounded by substantially-parallel walls (161) and the transfer link may comprise a second rounded marginal end portion (59) engaging the walls of the opening of the reference member. The servovalve may comprise at least one bearing (56) acting between the drive member and the transfer link. The motor may be toroidal. The control port of the valve may be in fluid communication with an actuator having a load.

DESCRIPTION OF THE EMBODIMENTS

Figure 1:
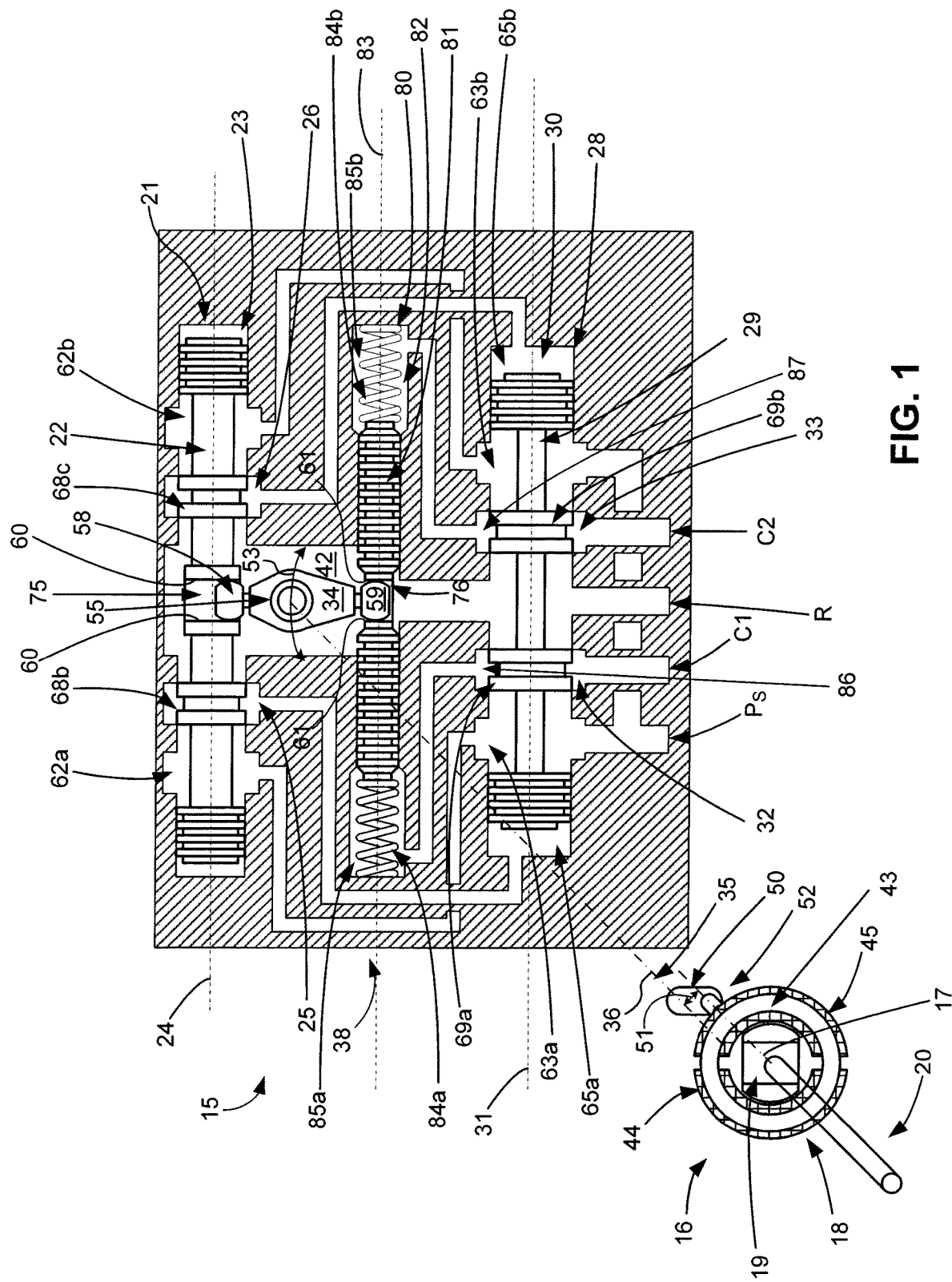
FIG. 1 is a schematic view of an embodiment of an improved two-stage electrohydraulic pressure flow control servovalve, in which the first stage valve is in a centered or null position relative to the cylinder and the second stage valve is in a first position that prevents flow through the second stage valve.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., crosshatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, an improved two-stage electro-hydraulic valve is provided, an embodiment of which is generally indicated at 15. Valve 15 is shown as broadly including motor 16, first bias mechanism 20, drive member 35, transfer link 34, first stage valve 21, second stage valve 28, and reference stage element 80.

Figure 2:
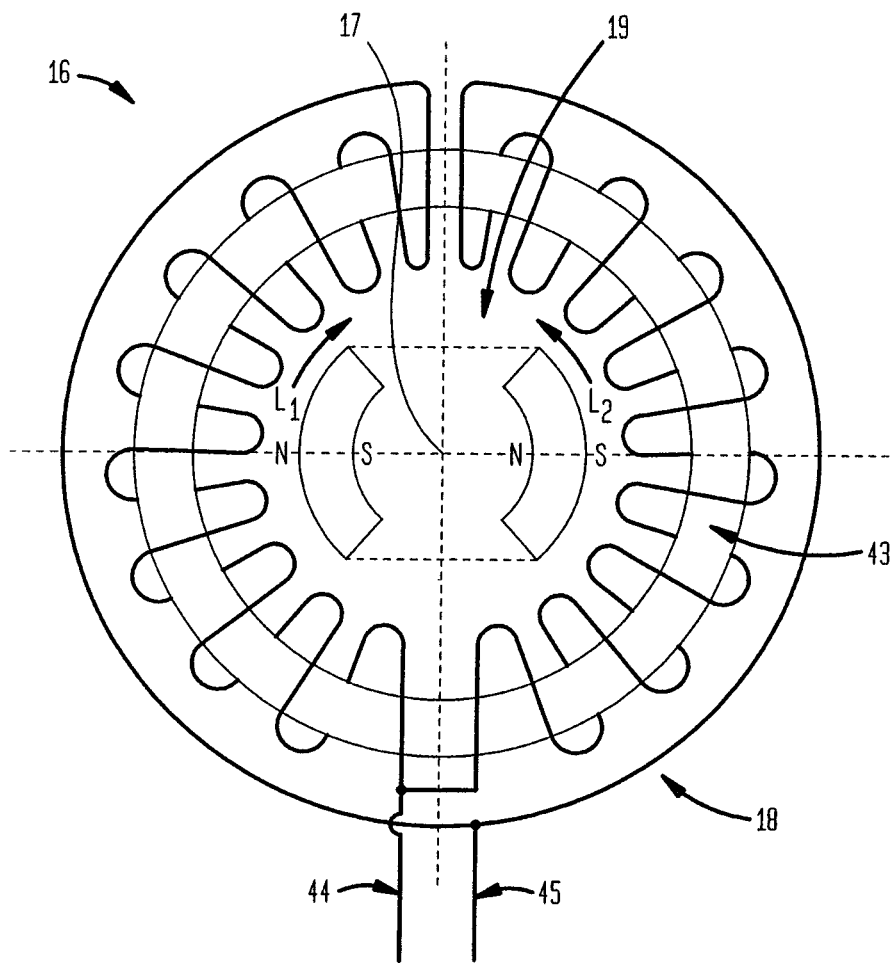
FIG. 2 is an enlarged schematic view of the motor shown in FIG. 1.

In this embodiment, motor 16 is a rotary brushless DC toroid motor having a single pole and phase and limited angular displacement. As shown, motor 16 includes stator 18 and rotor 19. As shown in FIG. 2, in this embodiment stator 18 is a toroid and has a circular ring-shaped core 43 around which coils 44 and 45 are wound. Coil 44 is wound clockwise half-way around core 43, from the six o'clock position to the twelve o'clock position, and is then looped, not wound, back to the six o'clock position, while coil 45 is wound counterclockwise half-way around core 43, from the six o'clock position to the twelve o'clock position, and is then looped, not wound, back to the six o'clock position. In addition, coils 44 and 45 are wound around core 43 in opposite directions relative to the center circular axis 17 of core 43. Coil 44 is wrapped in one direction and, depending upon the rotation and the magnetic field, current will produce an electromagnetic force in one direction. By bringing the end of coil 44 back around and connecting it over to coil 45, which is wrapped around core 43 in the opposite direction, torque summing from both halves is provided but the inductance is almost cancelled. With the wiring shown, having a path around one half of the circumference of metallic soft magnetic core 43, and a second path around the other half of the circumference of core 43, wrapping around and starting on the opposite end and then coming back, torque summation from current and electromagnetic force is provided but inductance is canceled. And by joining the wires as shown, a single coil is provided. However, to impart redundancy, wires 44 and 45 may be two-stranded wires or twisted pairs. If power from a controller or a computer is lost in one wire, or if one of the wires breaks, the other wire is available to do the same exact thing. Electrically this results in a very fast device. By wrapping the coils 44 and 45 around ring-like core 43 to provide a toroid, the torque density as compared to a stator toothed design is less. However, there is also significantly less cogging or torque ripple. In addition, by wrapping wires 44 and 45 around soft magnetic core 43 and changing current in both directions, depending upon the frequency or speed of current that is flowing through the wire, eddy current losses are produced that act like little dampers or resistance to motion as a function of speed, or increased torque resistance as a function of speed. The typical manner of handling that is to form stator core 43 from laminates. A core having multiple laminates and insulating material there between can be used to reduce or eliminate such dampening or eddy current loss. However, in this embodiment, some dampening is desired. By designing stator core 43 with a certain number of laminates, such as two halves, three-thirds, four-fourths or more, the amount of dampening can be selected to provide a stable high performance valve.

In this embodiment, rotor 19 consists essentially of a permanent magnet. Thus, other than grounding spring 46 and output shaft 52, the magnet comprises the entire rotor. The power coming out of the magnet is more substantial and, because of the shape of the magnet, the arc angle of the magnet can be larger without causing manufacturing complications.

As shown, first bias mechanism 20 acts on rotor 19. In this embodiment, bias mechanism 20 comprises torsional spring 46 and clamp 48 set to bias rotor 19 back to a desired null or grounded position. Mechanism 20 not only acts like a spring to bias rotor 19, it also supports or holds rotor 19 in position relative to stator 18. Rather than rotating about axis 17 on bearings, rotor 19 is suspended by spring 46 and acts as a flexural straining element. This eliminates parts like bearings and friction elements. As shown, spring 46 is part of rotor 19 and extends to the top of the cavity of upper part 41 of housing 38, where it is grounded. A single jewel bearing 49 at the bottom of rotor 19 is used to remove side motion. To reference rotor 19 and bias mechanism 20 to zero or ground, so that motor 16 and valves 21 and 28 are grounded and referenced to housing 38, clamp 48 can be adjusted or rotated relative to housing 38 to get the position desired to reference the null of motor 16 relative to the output flow of second stage valve 28. Clamp 48 can be rotationally adjusted, and thus rotor 19 rotationally adjusted relative to stator 18, to provide a desired motor null position in which torsion spring 46 is not flexed or strained. Thus, the null position of rotor 19 may be adjusted as desired by the user by resetting clamp 48 to the desired rotational position without having to access motor 16. While a torsional spring is shown and described, other bias mechanisms may be used as alternatives.

As shown, output shaft 52 of rotor 19 rotates about motor axis 17 relative to housing 38. In this embodiment, drive member 35 is an eccentric cylindrical shaft elongated about center axis 36. Eccentric drive shaft 35 is rotationally coupled to rotor 19 by offset link 50, such that motor axis 17 is offset a distance 51 from center longitudinal axis 36 of drive shaft 35. Thus, output shaft 52 of rotor 19 is linked to eccentric drive 35 such that longitudinal axis 36 of eccentric drive shaft 35 is set off from rotational axis 17 of rotor 19. When rotor 19 rotates about axis 17, that rotation is transferred to eccentric drive shaft 35 and causes distal end 54 of shaft 35 to move in an arc path 53. Such motion is transferred to transfer link 34 at connection joint 71.

Transfer link 34 extends generally transversely between spool 22 of valve 21 and piston 81 of reference element 80. As shown, transfer link 34 comprises first end 58 that engages slot or seat 75 in spool 22 at connection joint 70, second end 59 that engages slot or seat 76 in piston 80 at connection joint 72, and recess or opening 55 between ends 58 and 59 sized and configured to receive end pin 54 of eccentric drive shaft 35 to form connection joint 71. As shown, end 58 is a rounded ball-like end portion that is received between two facing parallel planar walls, severally indicated at 60, of notch or slot 75 in valve spool 22. Similarly, end 59 is a rounded ball-like end portion that is received between two facing parallel planar walls, severally indicated at 61, of notch or slot 76 in piston 80. This design is such that transfer link 34 takes out possible misalignment between spool 22 and piston 81 and rotor axis 17. Since ends 58 and 59 of transfer link 34 are generally spherical and machined into link 34, they allow transfer link 34 to angularly sweep and still drive valve spool 22, but they also allow the system to dynamically adjust for misalignment and thereby reduce the potential for binding, excessive friction and jamming. Link 34 allows the spool, piston and drive shaft to seek their defined positions such that all of the members are mechanically connected but not binding.

End pin 54 of eccentric drive 35 fits within hole 55 in transfer link 34. Annular earing 56 between pin 54 of drive 35 and hole 55 of transfer link 34 allows for some relative rotational movement at connection joint 71. However, movement of pin 54 of drive 35 in arc 53 causes transfer link 34 to move in what appears to be a linear fashion, thereby moving first spool 22 along axis 24.

Figure 3:
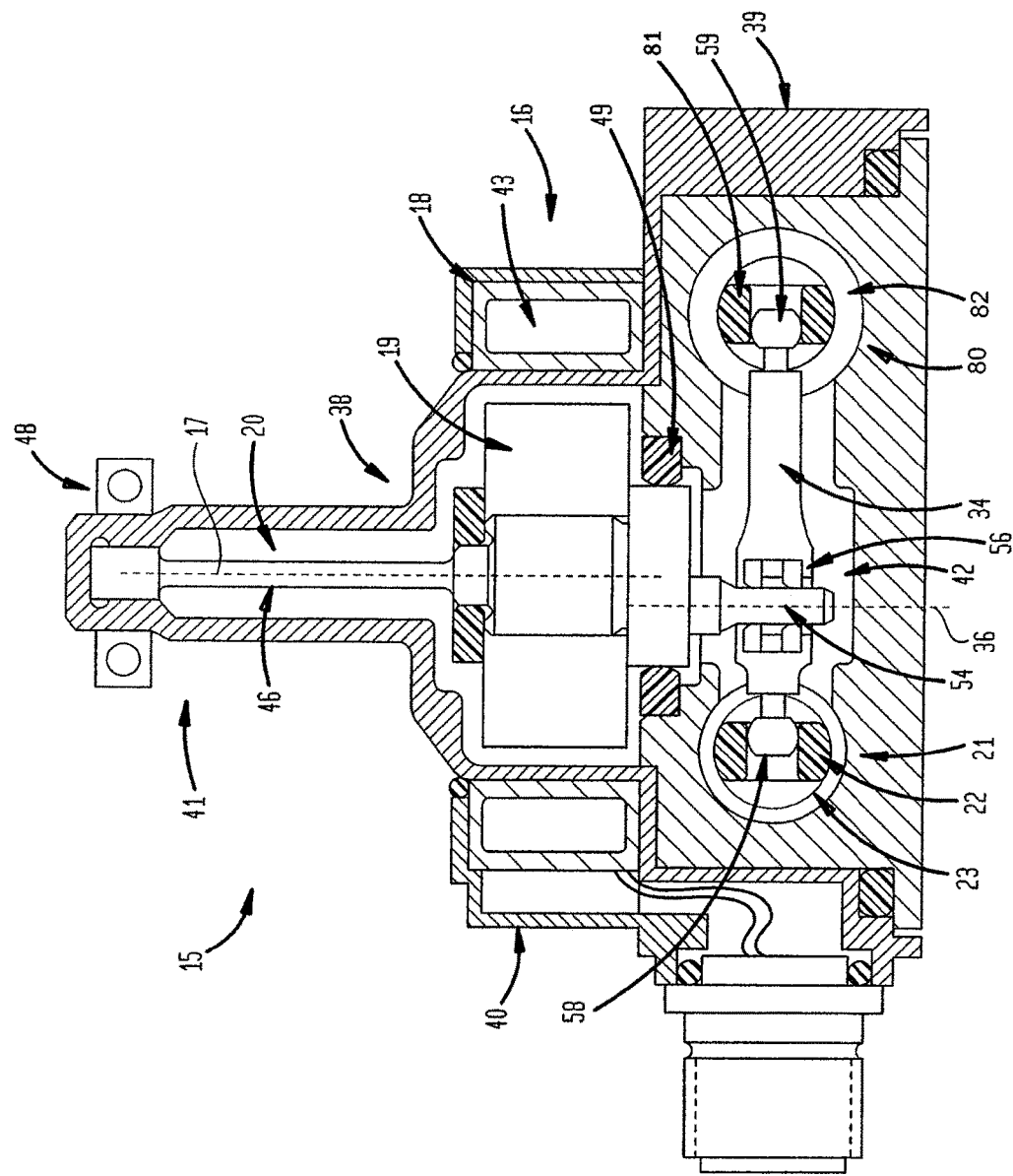
FIG. 3 is a partial vertical cross-sectional view of the first stage valve and reference stage element shown in FIG. 1.

As shown in FIG. 3, valve 15 is an assembled body, generally indicated at 38. Body 38 includes reference part 39 housing first stage valve 21 and reference stage element 80 (second stage valve 28 is not shown and is preferably orientated below reference part 39), intermediate or central part 40 housing motor 16, and upper or top part 41 housing bias mechanism 20. Thus, inside body 38 of valve 15 are included spool 22 and piston 81 that sit in chambers 23 and 82, respectively, machined into bushings that are pressed into body 38. Below reference part 39, body 38 of valve 15 includes spool 29 that sits in chambers 28, machined into bushings that are pressed into body 38 (not shown).

Four ports come into body 38. As shown in FIGS. 1 and 3, base 39 of valve 15 has operative connections to supply pressure Ps, fluid return R and two control ports, C1, C2, respectively. Hence, because there are four fluid connections, this valve is a four-way servo valve. However, it should be clearly understood that the embodiments are not limited to four-way valves, but could be readily adapted to a three-way valve, or some other form, as desired. Control ports C1 and C2 are the output of second stage valve 28. Supply port Ps brings in high pressure oil, water or other fluid or gas and connects to both supply or pressure chambers 63a and 63b of second stage valve 28 as well as pressure chambers 62a and 62b of first stage valve 21. Because first valve 21 is a pilot stage and has slots that are very small, filters may be provided in the supply lines to pressure chambers 62a and 62b, respectively, to trap and contain any particles of contamination and prevent valve spool 22 from jamming. The output flow from ports 25 and 26 of first stage valve 21 connect to the respective end chambers 65a and 65b of chamber 30 of second stage valve 28.

Body 38 has three horizontal through-bores which form chambers 23, 30 and 82 to receive and accommodate sliding movement of valve members 22 and 29 of first stage valve 21 and second stage valve 28, respectively, and piston 81 of reference stage element 80. In this embodiment, chambers 23, 30 and 82 are cylindrical. However, such through-bores may have non-circular cross sections, causing the chambers to be a non-cylindrical shape, such as a rectangular prism, or other similar shape. In this embodiment, valve members 22 and 29 are cylindrical valve spools. However, the valve spools may have alternative shapes, such as a rectangular prism forming a shear plate. In this embodiment, piston 81 is a generally cylindrical member. However, the piston may have alternative shapes. Valve chambers 23 and 30 and spools 22 and 29 are elongated about axis 24 and 31, respectively, such that valve spool 22 moves linearly along axis 24 and valve spool 29 moves linearly along axis 31, which is parallel to axis 24. Reference chamber 82 and piston 81 are elongated about axis 83 such that piston 81 moves linearly along axis 83, which is parallel to both axis 24 of valve spool 22 and axis 31 of valve spool 29. Each of axis 24, axis 31 and axis 83 are transverse to motor axis 17 and longitudinal axis 36 of eccentric drive shaft 35.

Reference part 39 includes a horizontal through bore extending transversely between chambers 23 and 82, which forms chamber 42 to receive and accommodate movement of transfer link 34 acting between first stage spool 22 and piston 81. Intermediate part 40 is adapted to face and engage reference part 39 and houses motor 16. Upper part 41 is in the nature of a cover which protectively surrounds and covers mechanism 20.

As shown in FIGS. 1 and 3, valve spool 22 comprises a plurality of lands and grooves along its longitudinal extent in the usual manner, and is adapted to be selectively and controllably shifted by end 58 of transfer link 34 either leftwardly or rightwardly, as desired, within cylinder 23 from the null position along axis 24 shown in FIG. 1. In this null position, respective lands on valve spool 22 cover ports 25 and 26 communicating with chambers 65a and 65b, respectively, of cylinder 30 of second valve stage 28. As shown, in the null configuration of FIG. 1, hydraulic flow between hydraulic supply Ps and supply chamber 62a through port 25 of cylinder chamber 23 is blocked by lands 68b. Similarly, flow between hydraulic supply Ps and supply chamber 62b through port 26 of cylinder chamber 23 is blocked by lands 68c. Hydraulic fluid in chambers 62a and 62b is prevented from flowing out by spool lands 68b and 68c, respectively. Thus, spool 22, and in turn spool 29, are constrained from moving due to pressure equilibrium.

As shown in FIGS. 1 and 3, valve spool 29 comprises a plurality of lands and grooves along its longitudinal extent in the usual manner, and is adapted to be selectively and controllably shifted by differential pressure between end chambers 65a and 65b either leftwardly or rightwardly, as desired, within cylinder 30 from the position along axis 31 shown in FIG. 1. In this position, respective lands on valve spool 29 cover ports 32 and 33, respectively, of control openings C1 and C2 to prevent flow through the valve.

As shown in FIGS. 1 and 3, piston 81 comprises an elongated cylindrical member that is adapted to be selectively and controllably shifted by hydraulic differential pressure between end chambers 85a and 85b either leftwardly or rightwardly, as desired, within cylinder 80 from the position along axis 83 shown in FIG. 1. In this position, the differential pressure in chambers 85a and 85b is equalized such that the rightwardly directed bias of spring 84a on the left end of piston 81 is equal to the leftwardly directed bias of spring 84b on the right end of piston 81. Thus, piston 81 is biased by opposed springs 84a and 84b to the neutral position shown in FIG. 1. In this position, respective lands 69a and 69b on valve spool 29 cover ports 86 and 87, respectively, of chamber 30 of second valve stage 28 communicating with chambers 85a and 85b, respectively, of cylinder 82 of reference stage 80.

Coil 44, 45 may be selectively energized by supplying it with a current of appropriate magnitude and plurality to cause rotor 19 to rotate about axis 17 in either a clockwise or counterclockwise direction. The direction of rotor movement is determined by the polarity of the supplied current. The magnitude of angular rotor movement is determined by the magnitude of the supplied current.

Figure 4:
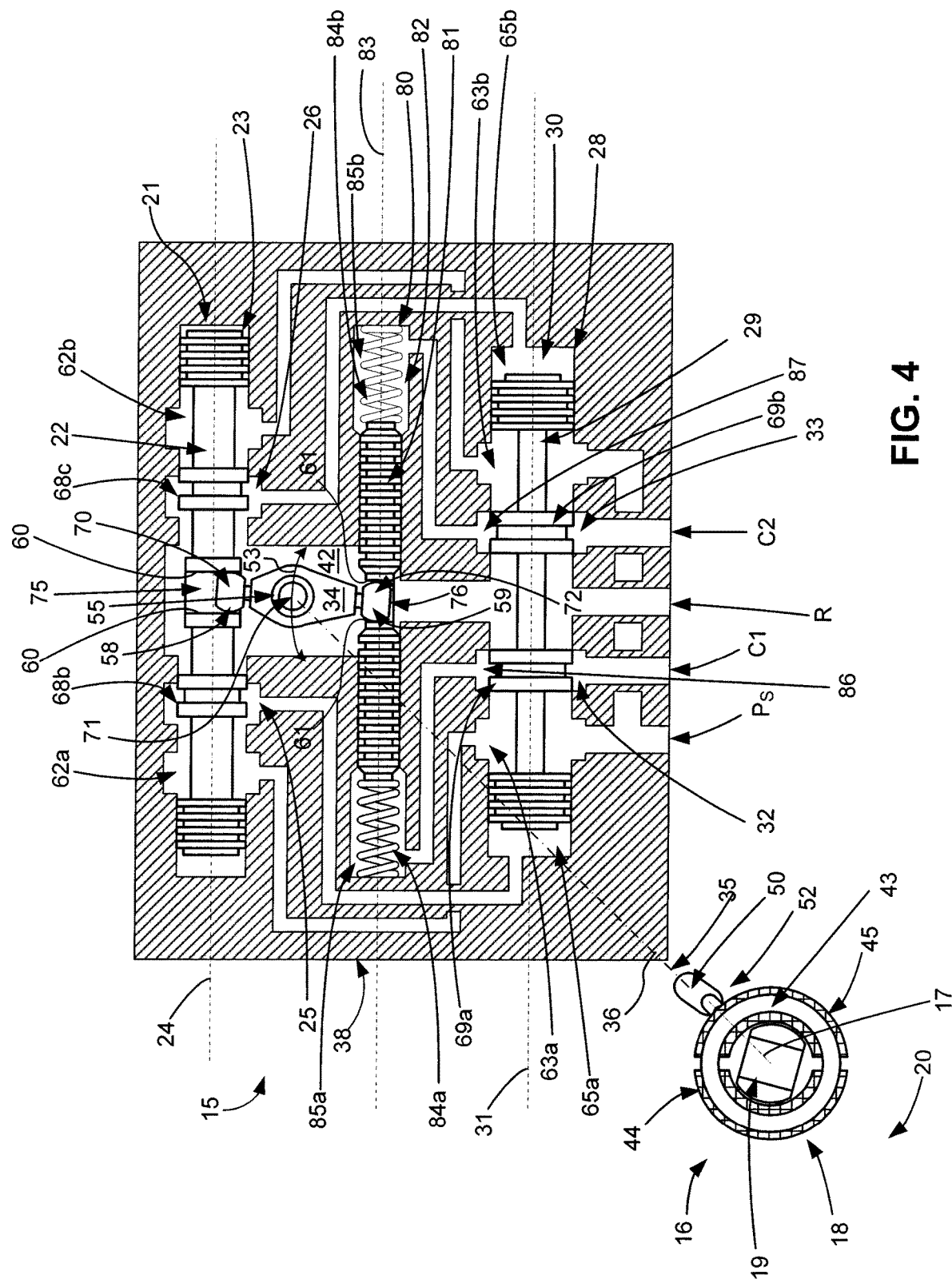
FIG. 4 is a schematic view of the valve shown in FIG. 1, in which the rotor has been rotated about 10° in a clockwise direction from the position shown in FIG. 1, such movement producing concomitant movement through the drive member and the transfer link of the first stage valve spool off-null.

In FIG. 4, rotor 19 is shown as having just rotated about axis 17 approximately 10° in a clockwise direction from the rotary null position shown in FIG. 1. When rotor 19 rotates clockwise about axis 17, as shown in FIG. 4, such rotation causes pin 54 of eccentric drive shaft 35 to move to the right along arc 53. Because at this point spool 29 is constrained from movement due to equalized pressure at both its ends as described above, connection joint 72 between ball end 59 of link 34 and piston notch walls 61 of piston momentarily acts as a fixed axis. Because of this and the eccentric offset described above, movement of pin 54 of eccentric drive shaft 35 to the right along arc 53 causes ball end 58 of transfer link 34 to move to the right. Thus, ball end 58 and connection joint 70 rotates clockwise relative to connection joint 72. As this occurs, ball end 58 causes valve spool 22 to move in one axial direction along axis 24 to the right within cylinder 23. As shown in FIG. 4, as valve spool 22 is moved off-null and to the right, spool lands 68b and 68c are no longer aligned on ports 25 and 26, respectively, which allows fluid to flow to or from ports 25 and 26, respectively, and in turn to and from ports 73a and 73b in chamber 30 to piston chambers 65a and 65b, respectively, of second stage valve 28. Such movement of spool 22 exposes port 25 to high supply pressure and exposes port 26 to low return pressure. This displaced condition of spool 22 enables fluid to flow into chamber 65a of second stage valve 28 from supply and to flow out of chamber 65b of second stage valve 28 to return, thus creating a pressure differential between one end of spool 29 and the other end of spool 29.

Figure 5:
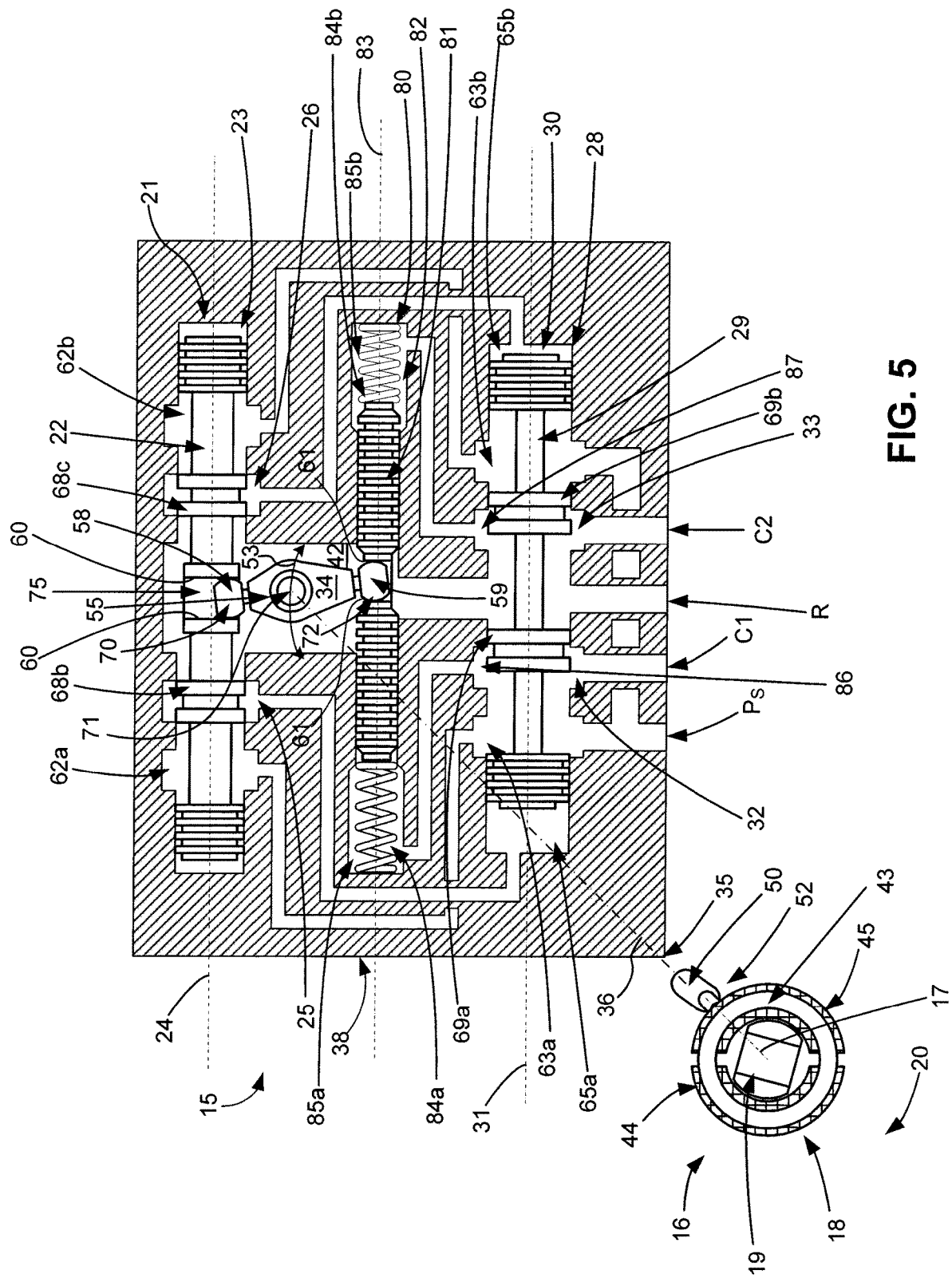
FIG. 5 is a schematic view of the valve shown in FIG. 1, in which the second stage valve has moved to the desired pressure differential, such movement producing through the reference piston and the transfer link concomitant movement of the first stage valve spool back to the null position shown in FIG. 1.

When this happens, since control ports 25 and 26 from first stage valve 21 are feeding the ends of spool 29 of second stage valve 28 as described above, spool 29 is moved in one axial direction along axis 31 to the right within cylinder 30. As shown in FIG. 5, as valve spool 29 is moved to the right, spool lands 69a and 69b are no longer aligned on control ports 32 and 33, respectively, which allows fluid to flow to or from ports 32 and 33 and controls C1 and C2, respectively. Such movement of spool 29 exposes port 32 to high supply pressure Ps and exposes port 33 to low return pressure R. With valve spool 29 moving to the right, spool lands 69a and 69b are also no longer aligned on reference ports 86 and 87, respectively, which allows fluid to flow to or from ports 86 and 87 and controls C1 and C2, respectively.

Such movement of spool 29 exposes port 86 to high supply pressure Ps and exposes port 87 to low return pressure R. This displaced condition of spool 29 enables fluid to flow into chamber 85a of reference stage 80 from supply and to flow out of chamber 85b of reference stage 80 to return, thus creating a pressure differential between one end of piston 81 and the other end of piston 81 when there is a load on valve 15 and controls C1 and C2. Thus, any pressure differential between C1 and C2 will move reference piston 81 and thereby return first stage valve 21 to null via transfer link 34.

Accordingly, there is a connection between output C1 and the left end of reference piston 81 and on the other side there is a connection between output C2 and the right end of reference piston 81. So as first stage spool 22 moves, second stage spool 29 moves in reaction to the flow coming out of control ports 25 and 26 of first stage valve 21. When valve 15 is loaded, since one of control ports C1 or C2 is exposed to pressure port Ps whereas the other of control ports C1 or C2 is exposed to return port R, there is a pressure differential on piston 81. The porting between C1 and C2 of second stage valve 28 connected to end chambers 85a and 85b of reference piston 80 responds to the resulting pressure differential or ΔP, with moves transfer link 34 to reestablish null of spool 22 as described below.

The movement of piston 81 to the right also causes movement of transfer link 34. In particular, as shown in FIG. 5, because at this point end pin 54 of drive shaft 35 is held in position by motor 16, connection joint 71 between pin 54 and hole 55 in link 34 acts as a fixed axis. With movement of piston 81 to the right, ball end 59 and connection joint 72 moves counterclockwise about connection joint 71 and eccentric axis 36, causing transfer link 34 to rotate counterclockwise about connection joint 71 and eccentric axis 36. Counter-clockwise rotation of transfer link 34 about axis 36 causes ball end 58 of transfer link 34 and connection joint 70 to move counterclockwise about connection joint 71 and eccentric axis 36 and to the left. Movement of ball end 58 to the left causes valve spool 22 to move to the left within cylinder 23 until first stage valve 21 returns to the null position. As shown in FIG. 5, as valve spool 22 is moved left, spool lands 68b and 68c realign over ports 25 and 26, respectively, which stops fluid flow from port 25 to end chamber 65a and from port 26 to end chamber 65b of chamber 30 of second stage valve 28. Spool 29 stops moving with the closing of ports 25 and 26 and the return of equilibrium pressure at both ends of spool 29 and in turn both ends of piston 81. Thus, piston 81 cancels the motion of the held position of rotor 19 and eccentric drive pin 54 and rotates transfer link 34 about axis 36 until it reestablishes null of first stage spool 22 of first stage valve 21 based on pressure. If there is no load or pressure differential between C1 and C2, reference piston 81 will not move. Thus, spool 22 does not return to null until a pressure differential is reached, rather than a position of flow.

If the polarity of the supplied current were reversed, rotor 17 would rotate counterclockwise about axis 17, with such rotation causing pin 54 of eccentric drive shaft 36 to move to the left along arc 53, in turn causing ball end 58 of transfer link 34 to move to the left, thereby causing spool 22 to move left along axis 24 off null to displace spool 22 in the opposite direction relative to cylinder 23. Connection joints 70, 71 and 72 are said to be floating connections since their axis is not fixed relative to actuator body 38. Axes 17 is not floating.

Because rotor 19 is an inertial mass suspended on torsion spring 43, the frequency of rotor 19 is a potential issue, particularly if that frequency is in the middle of the operational frequency of valve 15. To address this, some dampening is provided. It is acceptable to have damping and slow the response because of the amplification between first stage valve 21 and second stage valve 28. Such dampening is provided in two places. As mentioned above, some dampening may be provided by controlling the number of laminations forming core 43. Second, narrowing orifices may be provided at the end of the fluid connection between R and the end chambers of first stage chamber 23 to help squelch the motion of first stage spool 22. So if rotor 19 were to start resonating violently, first stage spool 22 would have to start moving with it because spool 22 and rotor 19 are connected via drive member 35 and transfer link 34 as described above. If this starts to happen, such orifices will start to impede the motion of first stage spool 22, making it look like a dynamic attenuator or spring.

First bias mechanism 20 is provided so that valve 15 will have a given rated flow at a rated current. Spring 46 is selected such that with the appropriate amount of rotational motion of rotor 19, spring 46 will deflect that same amount and produce the amount of counter torque equal to the rated current and torque constant of motor 16. So if the rated current is 35 milliamps and 10 degrees of rotation on rotor 19 is desired, spring 46 is selected accordingly. Thus for a given flow rate or pressure output there is a given current input to produce it.

Reference piston 81 arrives at a position or a command based on a pressure differential or $\Delta P$ and mechanically conveys that it has arrived at that position. The position of reference piston 81 is slaved to first staged spool 22 via transfer link 34 and the motion of transfer link 34 is slaved to the position of rotor 19 because of spring 46 and the current or torque constant of motor 16. So for a given amount of current, a certain amount of torque out of motor 16 produces motion into eccentric pin 54, which in turn produces a relative position of first stage spool 22, which may in turn produce a $\Delta P$ across reference piston 81, and reference piston 81 is slaved to first stage spool 22 via transfer link 34.

Valve 15 provides a number of advantages. First, multiple valves 15 may be used to control multiple force summed actuators. If the exact same electrical current is supplied to each of such multiple valves, the force output of the subject actuators will be synchronized. There is no force fight across the multiple actuators and extra electronics, $\Delta P$ transducers and linkages are not needed. Second, motor 16 does not have to be extremely large. Motor 16 only has to have enough power to move first stage spool 22, as first stage valve 21 moves second stage valve spool 29. Third, the first stage valve 21 has a smaller amount of motion but amplifies the motion of second stage valve 28 by having control flow coming from middle lands 68b and 68c to the ends 65a and 65b of spool 29. The slots of the larger second stage spool 29 are much wider so, with very small motion of first stage spool 22, extreme motion out of second stage spool 29 is achieved.

In this embodiment, rotor 19 is designed to rotate only plus or minus 10 degrees about motor axis 17 off of the rotor null position. Most limited angle torque motors can go up to plus or minus 30 or 35 degrees and still have a linear function of torque and current. The reason this embodiment it is limited to only 10 degrees is it defines the stiffness of spring 46. The less stroke, the stiffer spring 46 becomes, which means the resonant frequency of first stage spool 22 increases. The optimum choice is to minimize the rotor angular amplitude as much as possible but still provide enough that backlash is eliminated.

Figure 6:
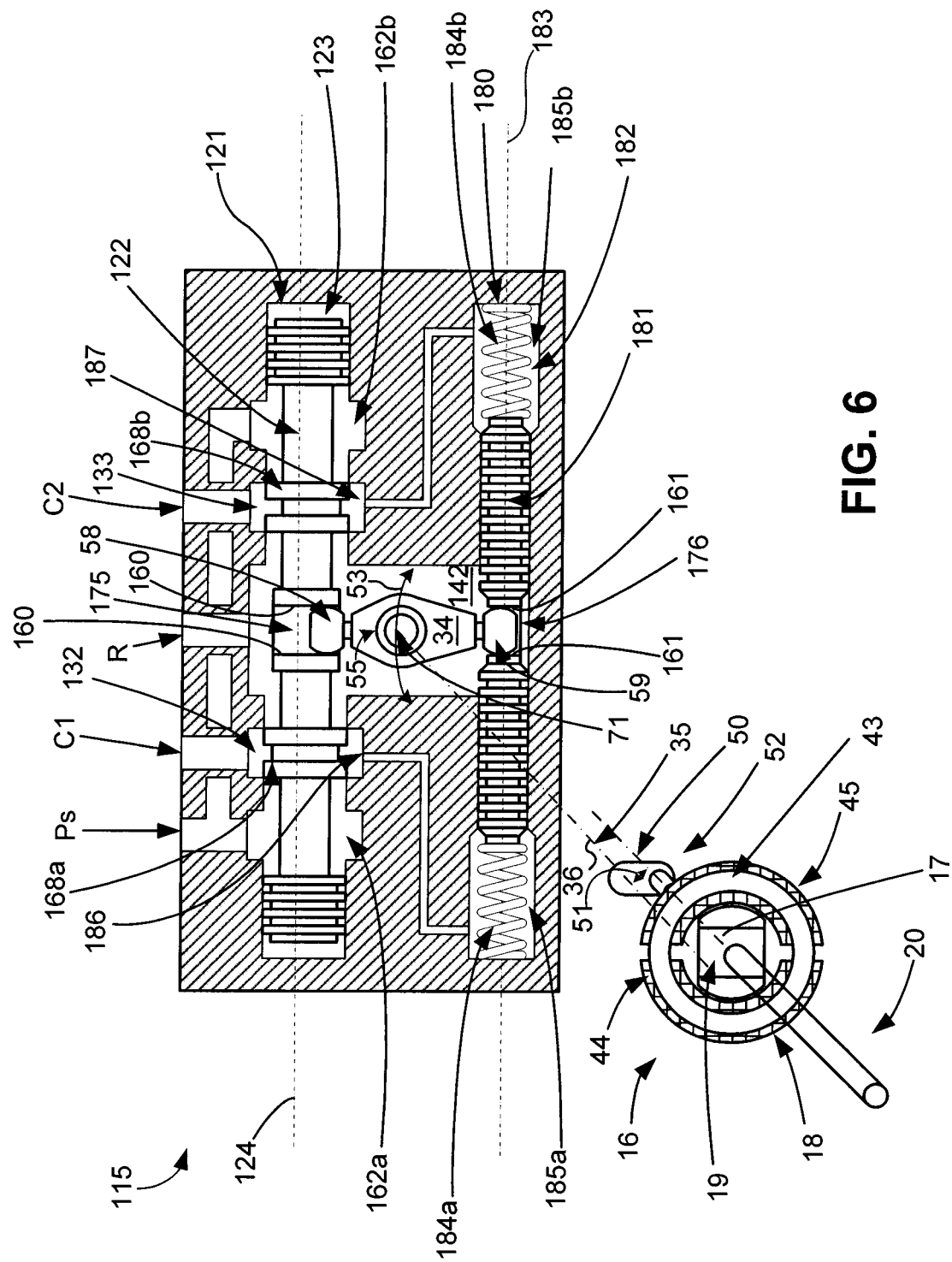
FIG. 6 is a schematic view of a second embodiment of an improved single stage electrohydraulic pressure flow control servovalve, in which the valve is in a centered or null position relative to the cylinder and the reference element is in a first position.
Figure 7:
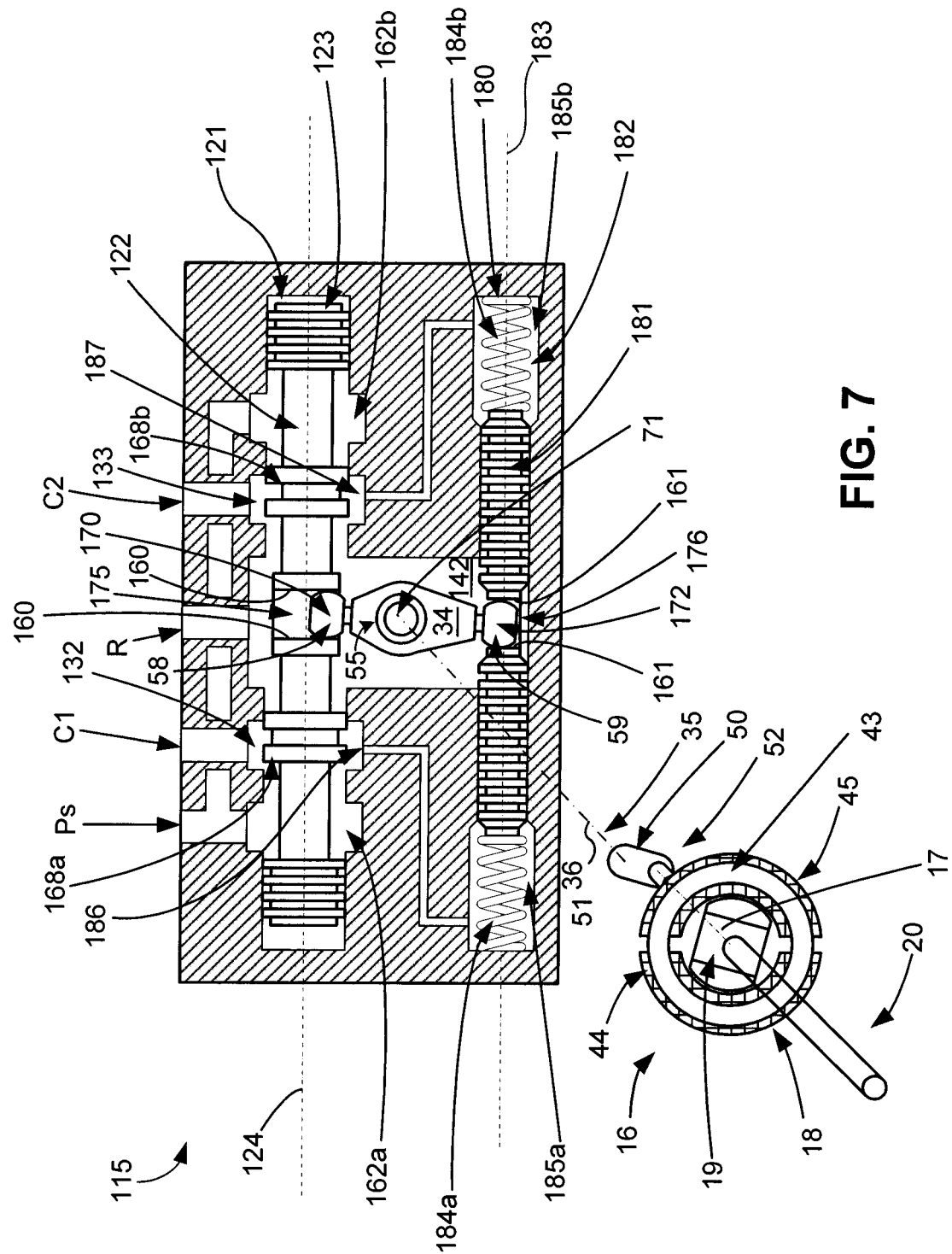
FIG. 7 is a schematic view of the valve shown in FIG. 6, in which the rotor has been rotated about 10° in a clockwise direction from the position shown in FIG. 1, such movement producing concomitant movement through the drive member and the transfer link of the valve spool off-null.
Figure 8:
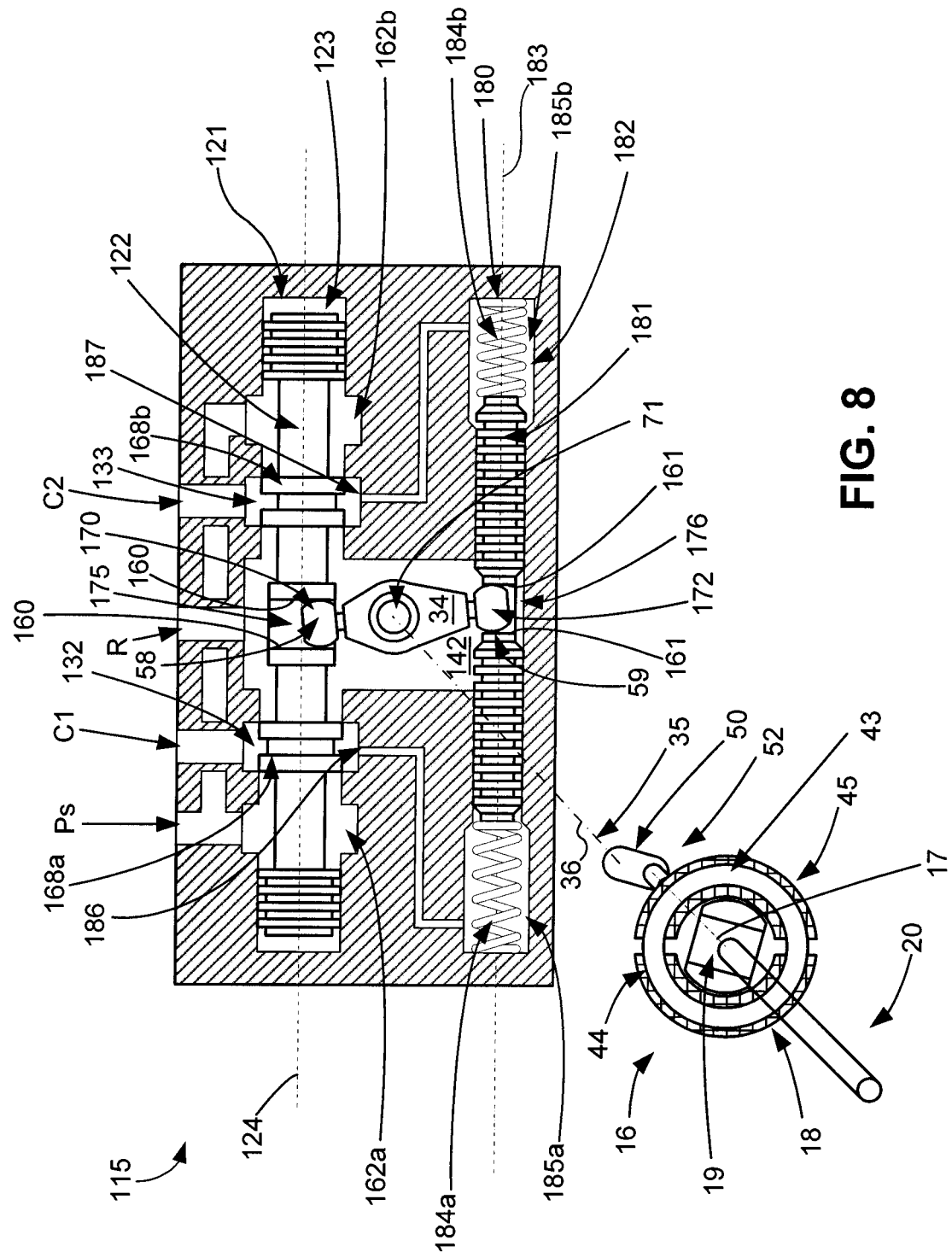
FIG. 8 is a schematic view of the valve shown in FIG. 1, in which the reference piston has moved as a result of a pressure differential, such movement producing through the transfer link concomitant movement of the valve spool back to the null position shown in FIG. 6.

Turning now to FIGS. 6-8, a servovalve according to a second embodiment is shown, which is generally indicated at 15. Servovalve 115 has most of the features of servovalve 15 described above in connection with FIGS. 1-5. The major difference between servovalve 115 and servovalve 15 lies in the fact that servovalve 115 is single stage and does not include second stage valve 28. Thus, valve 115 is shown as broadly including motor 16, first bias mechanism 20, drive member 35, transfer link 34, single valve 121 and reference stage element 180.

In this embodiment, motor 16, bias mechanism 20, output shaft 52, drive member 35, and transfer link 34 have all of the same features and are the same as shown in FIGS. 1-5 and described above with respect first embodiment servovalve 15. Thus, motor 16 is again a rotary brushless DC toroid motor having a limited angular displacement and includes stator 18 and permanent magnet rotor 19. Bias mechanism 20 acts on rotor 19 to bias rotor 19 back to a desired null or grounded position. Output shaft 52 of rotor 19 rotates about motor axis 17 relative to housing 38 and drive member 35 is an eccentric cylindrical shaft elongated about center axis 36 and rotationally coupled to rotor 19 by offset link 50, such that motor axis 17 is offset a distance 51 from center longitudinal axis 36 of drive shaft 35. When rotor 19 rotates about axis 17, that rotation is transferred to eccentric drive shaft 35 and causes distal end 54 of shaft 35 to move in an arc path 53. Such motion is transferred to transfer link 34 at connection joint 71.

Transfer link 34 extends generally transversely between spool 122 of valve 121 and piston 181 of reference element 180. As shown, transfer link 34 comprises first end 58 that engages slot or seat 175 in spool 122 at connection joint 170, second end 59 that engages slot or seat 176 in piston 180 at connection joint 172, and recess or opening 55 between ends 58 and 59 sized and configured to receive end pin 54 of eccentric drive shaft 35 to form connection joint 71. Movement of pin 54 of drive 35 in arc 53 causes transfer link 34 to move in what appears to be a linear fashion, thereby moving spool 122 along axis 124. As shown, end 58 is a rounded ball-like end portion that is received between two facing parallel planar walls, severally indicated at 160, of notch or slot 175 in valve spool 122. Similarly, end 59 is a rounded ball-like end portion that is received between two facing parallel planar walls, severally indicated at 161, of notch or slot 176 in piston 180.

Figure 9:
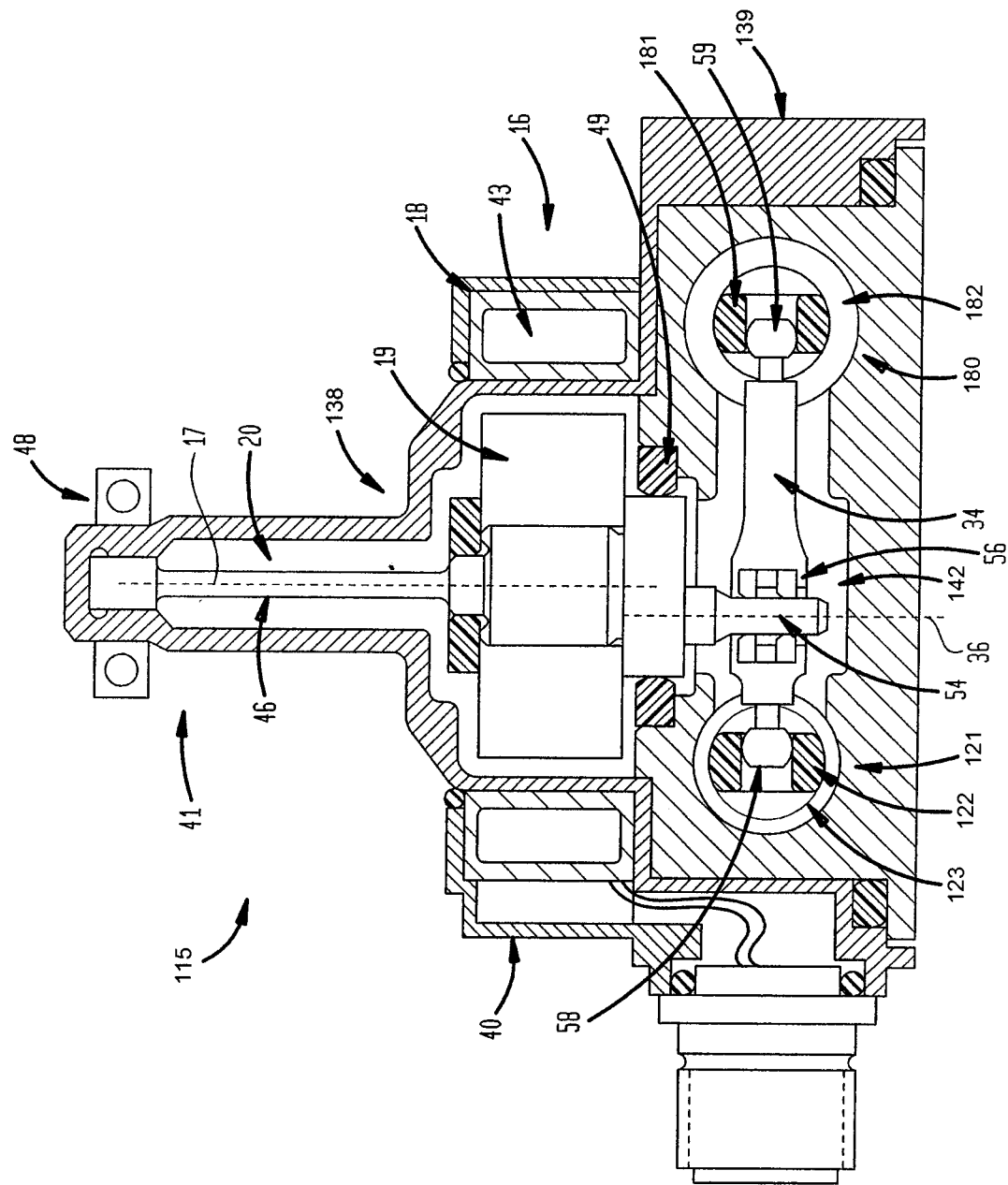
FIG. 9 is a vertical cross-sectional view of the valve shown in FIG. 6.

As shown in FIG. 9, valve 115 is an assembled body, generally indicated at 138. Body 138 includes lower or base part 139 housing valve 121 and reference stage element 180, intermediate or central part 40 housing motor 16, and upper or top part 41 housing bias mechanism 20. Thus, inside base part 139 of valve 115 are spool 122 and piston 181 that sit in chambers 123 and 182, respectively, machined into bushings that are pressed into body 138.

Four ports come into body 138. As shown in FIGS. 6-8, valve 115 has operative connections to supply pressure Ps, fluid return R and two control ports, C1, C2, respectively. Hence, because there are four fluid connections, this valve is also a four-way servo valve. However, it should be clearly understood that the embodiments are not limited to four-way valves, but could be readily adapted to a three-way valve, or some other form, as desired. In this embodiment, control ports C1 and C2 are the output of valve 121. Supply port Ps brings in high pressure oil, water or other fluid or gas and connects to supply or pressure chambers 162a and 162b of valve 121.

In this embodiment, base 138 has just two horizontal through-bores which form chambers 123 and 182 to receive and accommodate sliding movement of valve member 122 of valve 121 and piston 181 of reference stage element 180. In this embodiment, valve member 122 is a cylindrical valve spool and piston 181 is a generally cylindrical member. Valve chamber 123 and spool 122 are elongated about axis 124 such that valve spool 122 moves linearly along axis 124. Reference chamber 182 and piston 181 are elongated about axis 183 such that piston 181 moves linearly along axis 183, which is parallel to axis 124 of valve spool 122. Each of axis 124 and 183 are transverse to motor axis 17 and longitudinal axis 36 of eccentric drive shaft 35. Base 139 also includes a horizontal through bore extending transversely between chambers 123 and 182, which forms chamber 142 to receive and accommodate movement of transfer link 34 acting between spool 122 and piston 181. Intermediate part 40 is adapted to face and engage base part 139 and houses motor 16. Upper part 41 is in the nature of a cover which protectively surrounds and covers mechanism 20.

As shown in FIGS. 6-8, valve spool 122 comprises a plurality of lands and grooves along its longitudinal extent in the usual manner, and is adapted to be selectively and controllably shifted by end 58 of transfer link 34 either leftwardly or rightwardly, as desired, within cylinder 123 from the null position along axis 124 shown in FIG. 6. In this null position, respective lands on valve spool 122 cover ports 132 and 133, respectively, of control openings C1 and C2 to prevent flow through the valve. As shown, in the null configuration of FIG. 1, hydraulic flow between hydraulic supply Ps through port 186 of cylinder chamber 123 is blocked by lands 168a. Similarly, flow between hydraulic supply Ps through port 187 of cylinder chamber 123 is blocked by lands 168b. Hydraulic fluid in chambers 162a and 162b is prevented from flowing out by spool lands 168a and 168b, respectively. Thus, spool 122, and in turn piston 181, are constrained from moving due to pressure equilibrium.

As shown in FIGS. 6-8, piston 181 comprises an elongated cylindrical member that is adapted to be selectively and controllably shifted by hydraulic differential pressure between end chambers 185a and 185b either leftwardly or rightwardly, as desired, within cylinder 180 from the position along axis 183 shown in FIG. 1. In this position, the differential pressure in chambers 185a and 185b is equalized such that the rightwardly directed bias of spring 184a on the left end of piston 181 is equal to the leftwardly directed bias of spring 184b on the right end of piston 181. Thus, piston 181 is biased by opposed springs 184a and 184b to the neutral position shown in FIG. 1. In this position, respective lands 168a and 168b on valve spool 122 cover ports 186 and 187, respectively, of chamber 123 of valve 121 communicating with chambers 185a and 185b, respectively, of cylinder 182 of reference stage 180.

In FIG. 7, rotor 19 is shown as having just rotated about axis 17 approximately 10° in a clockwise direction from the rotary null position shown in FIG. 6. When rotor 19 rotates clockwise about axis 17, as shown in FIG. 7, such rotation causes pin 54 of eccentric drive shaft 35 to move to the right along arc 53. Because at this point piston 181 is constrained from movement due to equalized pressure at both its ends as described above, connection joint 172 between ball end 59 of link 34 and piston notch walls 161 of piston 181 momentarily acts as a fixed axis. Because of this and the eccentric offset described above, movement of pin 54 of eccentric drive shaft 35 to the right along arc 53 causes ball end 58 of transfer link 34 to move to the right. Thus, ball end 58 and connection joint 170 rotates clockwise relative to connection joint 172. As this occurs, ball end 58 causes valve spool 122 to move in one axial direction along axis 124 to the right within cylinder 123. As shown in FIG. 7, as valve spool 122 is moved to the right, spool lands 168a and 168b are no longer aligned on control ports 132 and 133, respectively, which allows fluid to flow to or from ports 132 and 133 and controls C1 and C2, respectively. Such movement of spool 122 exposes port 132 to high supply pressure Ps and exposes port 133 to low return pressure R. With valve spool 122 moving to the right, spool lands 168a and 168b are also no longer aligned on reference ports 186 and 187, respectively, which allows fluid to flow to or from ports 186 and 187 and controls C1 and C2, respectively.

Such movement of spool 122 exposes port 186 to high supply pressure Ps and exposes port 187 to low return pressure R. This displaced condition of spool 122 enables fluid to flow into chamber 185a of reference stage 180 from supply and to flow out of chamber 185b of reference stage 180 to return, thus creating a pressure differential between one end of piston 181 and the other end of piston 181 when there is a load on valve 115 and controls C1 and C2. Thus, any pressure differential between C1 and C2 will move reference piston 181 and thereby return valve 121 to null via transfer link 34.

Accordingly, there is a connection between output C1 and the left end of reference piston 181 and on the other side there is a connection between output C2 and the right end of reference piston 181. So as spool 122 moves, when valve 115 is loaded, since one of control ports C1 or C2 is exposed to pressure port Ps whereas the other of control ports C1 or C2 is exposed to return port R, there is a pressure differential on piston 181. The porting between C1 and C2 of valve 121 connected to end chambers 185a and 185b of reference piston 180 responds to the resulting pressure differential or ΔP, with moves transfer link 34 to reestablish null of spool 122 as described below.

The movement of piston 181 to the right also causes movement of transfer link 34. In particular, as shown in FIG. 8, because at this point end pin 54 of drive shaft 35 is held in position by motor 16, connection joint 71 between pin 54 and hole 55 in link 34 acts as a fixed axis. With movement of piston 181 to the right, ball end 59 and connection joint 172 moves counterclockwise about connection joint 71 and eccentric axis 36, causing transfer link 34 to rotate counterclockwise about connection joint 71 and eccentric axis 36. Counter-clockwise rotation of transfer link 34 about axis 36 causes ball end 58 of transfer link 34 and connection joint 170 to move counterclockwise about connection joint 71 and eccentric axis 36 and to the left. Movement of ball end 58 to the left causes valve spool 122 to move to the left within cylinder 123 until valve 121 returns to the null position. As shown in FIG. 8, as valve spool 122 is moved left, spool lands 168a and 168b realign over ports 186 and 187, respectively, which stops fluid flow from port 186 to end chamber 185a and from port 187 to end chamber 185b of reference element 180. Piston 181 stops moving with the closing of ports 186 and 187 and the return of equilibrium pressure at both ends of piston 181. Thus, piston 181 cancels the motion of the held position of rotor 19 and eccentric drive pin 54 and rotates transfer link 34 about axis 36 until it reestablishes null of valve 121 based on pressure. If there is no load or pressure differential between C1 and C2, reference piston 181 will not move. Thus, spool 122 does not return to null until a pressure differential is reached, rather than a position of flow.

If the polarity of the supplied current were reversed, rotor 17 would rotate counterclockwise about axis 17, with such rotation causing pin 54 of eccentric drive shaft 36 to move to the left along arc 53, in turn causing ball end 58 of transfer link 34 to move to the left, thereby causing spool 122 to move left along axis 124 off null to displace spool 122 in the opposite direction relative to cylinder 123. Connection joints 170, 71 and 172 are said to be floating connections since their axis is not fixed relative to actuator body 138. Axes 17 is not floating.

Reference piston 181 arrives at a position or a command based on a pressure differential or ΔP and mechanically conveys that it has arrived at that position. The position of reference piston 181 is slaved to valve spool 122 via transfer link 34 and the motion of transfer link 34 is slaved to the position of rotor 19 because of spring 46 and the current or torque constant of motor 16. So for a given amount of current, a certain amount of torque out of motor 16 produces motion into eccentric pin 54, which in turn produces a relative position of valve spool 122, which may in turn produce a ΔP across reference piston 181, and reference piston 181 is slaved to first stage spool 122 via transfer link 34.

Various additional changes and modifications may be made to the described embodiments. For example, the size, shape and configuration of the various parts are not deemed to be critical, except as may be incorporated in the appended claims. Nor are the materials of construction deemed to be critical. As previously indicated, the valve spools and piston may be slidably mounted directly on the base, or may be slidably mounted within a bushing inserted into a throughbore provided on the base. In one embodiment, the head of ball end 58 and 59 is split, so that the rounded head portion consists of two portions that are biased away from one another so as to maintain frictionless rolling contact with the walls of the valve spool seat or piston seat in which the rounded head is engaged. Alternative motor types may be used to cause the rotor to rotate relative to the body.

Therefore, while the presently preferred form of an improved two stage electrohydraulic valve and an improved single stage electrohydraulic valve have been shown and described, and several modifications thereof discussed, persons skilled in this art will readily appreciate that various additional changes and modifications may be made without departing from the scope of the invention, as defined and differentiated by the claims.

What is claimed is:

1. A servovalve comprising:
a motor having a stator and a rotor and configured and arranged to rotate about a motor axis under the effect of a magnetic field generated by said stator;
said stator comprising a circular ring-like core and windings wound around said core in opposite directions about said core;
a first stage valve having a first valve member movably mounted in a first chamber along a first valve axis, and adapted to be moved from a first null position to a first off-null position along said first valve axis to selectively meter fluid flow from at least one port defined between said first valve member and said first chamber;
a second stage valve in fluid communication with said port of said first stage valve and having a second valve member movably mounted in a second chamber along a second valve axis, and adapted to be moved from a first position to a second position along said second valve axis as a function of movement of said first valve member, to selectively meter the flow of fluid from at least one control port and at least one reference port between said second valve member and said second chamber;
said first stage valve and said second stage valve configured and arranged such that said second valve member is at a pressure equilibrium and does not move when said first valve member is in said first null position;
a reference stage element in fluid communication with said reference port of said second stage valve and having a separate reference member movably mounted in a reference chamber along a reference axis, and adapted to be moved from a first position to a second position along said reference axis as a function of a pressure differential on said reference member;
a transfer link acting between said first valve member and said reference member;
a drive member acting between said rotor and said transfer link;
said transfer link and said drive member configured and arranged such that selective movement of said rotor from a rotor null position to a second rotor position causes said drive member and said transfer link to move said first valve member from said first null position to said first off-null position;
movement of said first valve member from said first null position to said first off-null position causes said second valve member to move from said first position to said second position; and
said movement of said second valve member to said second position applies on said reference member a pressure differential from a load;
said pressure differential on said reference member causes movement of said reference member; and
said movement of said reference member causes said transfer link to move said first valve member from said first off-null position back to said first null position.

2. A servovalve as set forth in claim 1, wherein said windings are wound around said circular ring-like core to form a toroid and said windings are wound around said circular ring-like core in a first wiring path around a first portion of a circumference of said circular ring-like core and in a second wiring path around a second portion of said circumference of said circular ring-like core.

3. A servovalve as set forth in claim 1, wherein said motor comprises a rotor consisting essentially of a magnet.

4. A servovalve as set forth in claim 1, wherein:
said transfer link comprises a first end portion engaging said first valve member at a first connection;
said transfer link comprises a second end portion engaging said reference member at a second connection;
said drive member and said transfer link are rotationally coupled at a third connection;
said transfer link is configured and arranged to move said first valve member from said first null position to said first off-null position with selective rotation about said second connection; and
said transfer link is configured and arranged to move said first valve member from said first off-null position back to said first null position with selective rotation about said third connection.

5. A servovalve as set forth in claim 1, wherein:
said transfer link comprises a first end portion engaging said first valve member at a first connection;
said transfer link comprises a second end portion engaging said reference member at a second connection;
said drive member and said transfer link are coupled at a third connection;
said drive member has a first eccentric axis that is off-set a distance from said motor axis;
said transfer link is configured and arranged to move said first valve member from said first off-null position back to said first null position with selective rotation about said first eccentric axis; and
said first eccentric axis is aligned with said third connection.

6. A servovalve as set forth in claim 1, wherein:
said second stage valve comprises a second reference port;
said reference chamber of said reference stage element comprises a first sub-chamber and a second sub-chamber;
said first reference port of said second stage valve is flow connected to said first sub-chamber and said second reference port of said second stage valve is flow connected to said second sub-chamber;
said reference member is adapted to be moved from said first position to said second position along said reference axis as a function of said pressure differential between said first sub-chamber and said second sub-chamber;
said first stage valve comprises a second port;
said second chamber of said second stage valve comprises a first sub-chamber and a second sub-chamber;
said first port of said first stage valve is flow connected to said first sub-chamber of said second stage valve and said second port of said first stage valve is flow connected to said second sub-chamber of said second stage valve; and
said second valve member is adapted to be moved from said first position to said second position along said second valve axis as a function of a hydraulic pressure differential between said first sub-chamber and said second sub-chamber of said second stage valve.

7. A servovalve as set forth in claim 1, wherein said first chamber, said second chamber and said reference chamber each comprise a cylinder, said first valve member and said second valve member each comprise a valve spool, and said reference member comprises a piston.

8. A servovalve as set forth in claim 7, wherein said first valve member comprises a slot bounded by parallel walls and said transfer link comprises a rounded marginal end portion engaging said walls of said slot of said first valve member and wherein said reference member comprises an opening or slot bounded by parallel walls and said transfer link comprises a second rounded marginal end portion engaging said walls of said opening of said reference member.

9. A servovalve comprising:
a motor having a stator and a rotor and configured and arranged to rotate about a motor axis under the effect of a magnetic field generated by said stator;
said stator comprising a circular ring-like core and windings wound around said core in opposite directions about said core;
a valve having a valve member movably mounted in a valve chamber along a valve axis, and adapted to be moved from a first null position to a first off-null position along said valve axis to selectively meter fluid flow from at least one control port and at least one reference port defined between said valve member and said valve chamber;
a reference stage element in fluid communication with said reference port of said valve and having a reference member movably mounted in a reference chamber along a reference axis, and adapted to be moved from a first position to a second position along said reference axis as a function of a pressure differential on said reference member;
a transfer link acting between said valve member and said reference member;
a drive member acting between said rotor and said transfer link;
said transfer link and said drive member configured and arranged such that selective movement of said rotor from said rotor null position to a second rotor position causes said drive member and said transfer link to move said valve member from said first null position to said first off-null position;
movement of said valve member from said first null position to said first off-null position applies on said reference member a pressure differential from a load;
said pressure differential on said reference member causes movement of said reference member; and
said movement of said reference member causes said transfer link to move said valve member from said first off-null position back to said first null position.

10. A servovalve as set forth in claim 9, wherein said windings are wound around said circular ring-like core to form a toroid and said windings are wound around said circular ring-like core in a first wiring path around a first portion of a circumference of said circular ring-like core and in a second wiring path around a second portion of said circumference of said circular ring-like core.

11. A servovalve as set forth in claim 9, wherein said motor comprises a rotor consisting essentially of a magnet.

12. A servovalve as set forth in claim 9, wherein:
said transfer link comprises a first end portion engaging said valve member at a first connection;
said transfer link comprises a second end portion engaging said reference member at a second connection;
said drive member and said transfer link are rotationally coupled at a third connection;
said transfer link is configured and arranged to move said valve member from said first null position to said first off-null position with selective rotation about said second connection; and said transfer link is configured and arranged to move said valve member from said first off-null position back to said first null position with selective rotation about said third connection.

13. A servovalve as set forth in claim 9, wherein:

said transfer link comprises a first end portion engaging said valve member at a first connection;

said transfer link comprises a second end portion engaging said reference member at a second connection;

said drive member and said transfer link are coupled at a third connection;

said drive member has a first eccentric axis that is off-set a distance from said motor axis;

said transfer link is configured and arranged to move said valve member from said first off-null position back to said first null position with selective rotation about said first eccentric axis; and said first eccentric axis is aligned with said third connection.

14. A servovalve as set forth in claim 9, wherein:

said valve comprises a second reference port;

said reference chamber of said reference stage element comprises a first sub-chamber and a second sub-chamber;

said first reference port of said valve is flow connected to said first sub-chamber and said second reference port of said valve is flow connected to said second sub-chamber; and said reference member is adapted to be moved from said first position to said second position along said reference axis as a function of said pressure differential between said first sub-chamber and said second sub-chamber.

15. A servovalve as set forth in claim 9, wherein said valve chamber and said reference chamber each comprises a cylinder and said valve member comprises a valve spool and said reference member comprises a piston.

16. A servovalve as set forth in claim 15, wherein said valve member comprises a slot bounded by parallel walls and said transfer link comprises a rounded marginal end portion engaging said walls of said slot of said valve member and wherein said reference member comprises an opening or slot bounded by parallel walls and said transfer link comprises a second rounded marginal end portion engaging said walls of said opening or slot of said reference member.

\* \* \* \* \*